United States Patent
Falk et al.

(10) Patent No.: US 7,214,273 B2
(45) Date of Patent: May 8, 2007

(54) NITROGEN INJECTION ASSEMBLY FOR USE IN AN OPTICAL FIBER COLORING AND CURING APPARATUS

(75) Inventors: Glen Falk, Blythewood, SC (US); Rick Alexander, Lexington, SC (US)

(73) Assignee: Pirelli Communications Cables & Systems USA, LLC, Lexington, SC (US)

( * ) Notice: Subject to any disclaimer, the term of this patent is extended or adjusted under 35 U.S.C. 154(b) by 217 days.

(21) Appl. No.: 10/491,413

(22) PCT Filed: Oct. 3, 2002

(86) PCT No.: PCT/US02/31551

§ 371 (c)(1),
(2), (4) Date: Aug. 12, 2004

(87) PCT Pub. No.: WO03/089381

PCT Pub. Date: Oct. 30, 2003

(65) Prior Publication Data

US 2004/0261699 A1    Dec. 30, 2004

Related U.S. Application Data

(60) Provisional application No. 60/327,229, filed on Oct. 5, 2001.

(51) Int. Cl.
*B05B 5/00*   (2006.01)
(52) U.S. Cl. ...................... 118/642; 118/420
(58) Field of Classification Search ............... 261/104, 261/DIG. 56; 118/420, 641, 733, 125, 67, 118/65, 68, 642; 427/162, 163.2; 65/430, 65/529, 530
See application file for complete search history.

(56) References Cited

U.S. PATENT DOCUMENTS 5,171,634 A   12/1992   Soszka et al.
5,942,020 A   8/1999   Marcelissen

FOREIGN PATENT DOCUMENTS

| EP | 1 088 638 A3 | 4/2001 |
| JP | 10-87347 | 4/1988 |
| JP | 63-277539 | 11/1988 |
| JP | 4-342445 | 11/1992 |
| JP | 4-342445 A1 | 11/1992 |
| JP | 6-211545 | 8/1994 |
| JP | 10-338552 A1 | 12/1998 |
| WO | WO 97/37824 | 10/1997 |

OTHER PUBLICATIONS

Shuichi; "Curing Device for Ultraviolet Curing Resin"; Patent Abstracts of Japan, of JP 10-338552, Dec. 22, 1998.

*Primary Examiner*—Brenda A. Lamb
(74) *Attorney, Agent, or Firm*—Finnegan, Henderson, Farabow, Garrett & Dunner, L.L.P.

(57) ABSTRACT

A nitrogen injection assembly for use in coloring and curing optical fibers is disclosed. The nitrogen injection assembly includes a cover section and a distribution seal. An optical fiber coated with ink passes from a coating die to a curing chamber via a passageway defined by the cover section and the distribution seal. The distribution seal injects nitrogen into the passageway to keep the coated fiber and the curing chamber substantially free of oxygen. With the distribution seal positioned closer to the curing chamber than the cover section, the apparatus minimizes the risk of leaks in the passageway and the number of required seals.

20 Claims, 5 Drawing Sheets

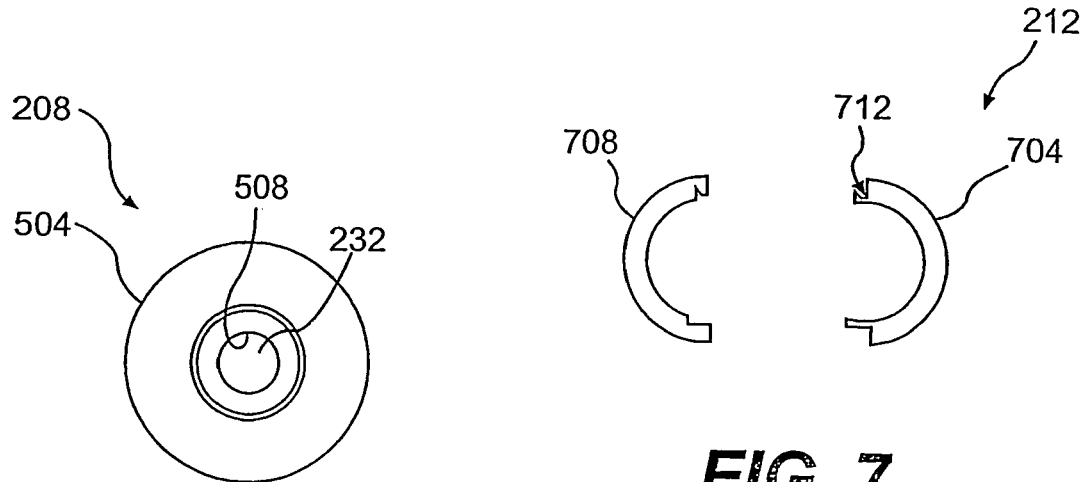
FIG. 5
FIG. 7
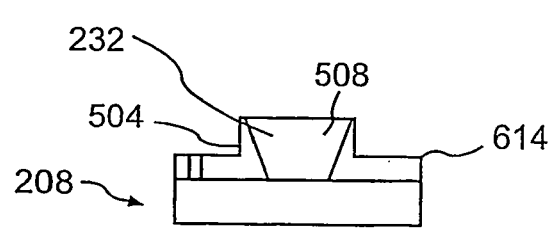
FIG. 6
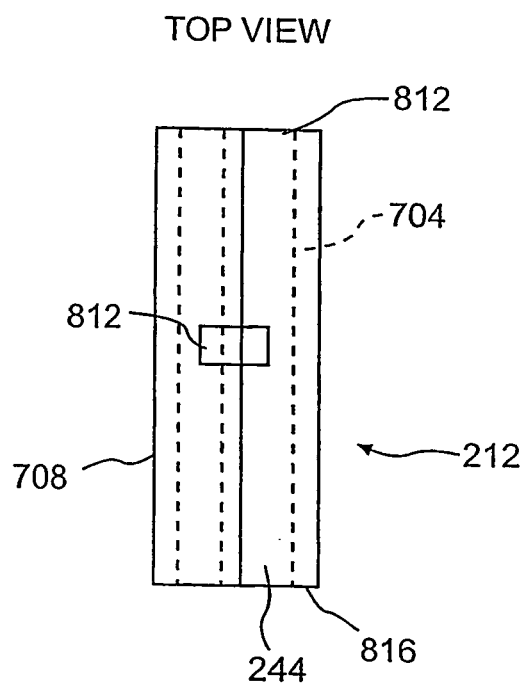
FIG. 8

NITROGEN INJECTION ASSEMBLY FOR USE IN AN OPTICAL FIBER COLORING AND CURING APPARATUS

CROSS REFERENCE TO RELATED APPLICATIONS

This application is an U.S. National Phase Application based on PCT/US02/31551, filed Oct. 3, 2002, the content of which is incorporated herein by reference, and claims the benefit of U.S. Provisional Application No. 60/327,229, filed Oct. 5, 2001.

BACKGROUND OF THE INVENTION

The present invention relates to an apparatus for applying and curing ink on optical fibers. More particularly, the present invention relates to an improved nitrogen injection assembly for use with a coating die assembly that applies ink to an optical fiber and a curing chamber that cures the ink with ultraviolet (UV) radiation.

Optical fibers are often colored to improve their identification and indexing. For example, a telecommunications worker can more easily distinguish one optical fiber from another when making splices between optical fiber cables if the fibers have distinctive colors.

The process for coloring optical fibers entails two basic steps. First, during the manufacture of the optical fiber, the drawn fiber is coated with ink by passing it through a coloring die assembly. Second, the ink is cured by passing the coated fiber through a chamber of UV radiation. Generally, this process is used for both individual optical fibers and for optical fibers that are formed into ribbons.

Inks used for coloring optical fibers typically do not adhere properly to optical fibers in the presence of oxygen. Consequently, the coloring inks are typically cured on optical fibers in a nitrogen environment. To ensure the absence of oxygen from the curing process, a nitrogen injection assembly is positioned between the coating die assembly and the UV curing chamber. The nitrogen injection assembly provides a passageway for the optical fiber between the coating die assembly and the curing chamber. An upper portion of the nitrogen injection assembly adds nitrogen to the passageway.

A lower portion of the nitrogen injection assembly is typically defined by a telescoping tube. In a setup mode, the telescoping tube is collapsed to provide access to the optical fiber. After-threading the optical fiber through the coloring die, an operator can access the fiber and attach it to a leader. The leader helps pull the fibers through the optical fiber coloring and curing apparatus. In an operating mode, the telescoping tube is extended to create a cylindrical passageway for the optical fiber between the nitrogen injection assembly and the curing chamber. Various seals ensure an airtight connection, keeping in nitrogen and keeping out oxygen from the ambient environment.

FIG. 1 illustrates a conventional nitrogen injection assembly for use in coating and curing ink on an optical fiber. This nitrogen injection assembly 100 generally comprises a nitrogen injection ring 108 mounted to the underside of a coloring die mounting plate 104. Coloring die mounting plate 104, which is part of a coloring die assembly, and nitrogen injection ring 108 both have central bores through which the drawn fiber passes. Nitrogen gas is injected into the bore in nitrogen injection ring 108 through a side port 152.

Below nitrogen injection ring 108 is a telescope tube. The tube includes a telescope tube holder ring 112 proximate to nitrogen injection ring 108. Holder ring 112 has a central bore that matches the bores of coloring die mounting plate 104 and nitrogen injection ring 108. The optical fiber passes through the central bore in holder ring 112. Both holder ring 112 and nitrogen injection ring 108 are attached to coloring die mounting plate 104 via screws or bolts in first threaded mounting hole 132, second screw hole 136, and third screw hole 140.

The telescope tube itself is made of a stationary telescope tube 116 and a sliding telescope tube 120. The sliding telescope tube 120, which has a larger diameter, fits around and slides over stationary telescope tube 116. By sliding telescope tube 120 up in a retracted position over stationary telescope tube 116, an operator can gain access to the fiber to attach it to a leader. When sliding telescope tube 120 is extended, it contacts a base 124 to create a sealed environment for the nitrogen to travel into the curing chamber (not shown). Base 124 has a central bore matching that of the telescope tube assembly and is mounted to the curing chamber (not shown).

During operation, when sliding telescope tube 120 is extended, nitrogen injection assembly 100 adds nitrogen via port 152 to the central bores defined by nitrogen injection ring 108, stationary tube 116, sliding tube 120, and base 124. The nitrogen in general flows downwardly with the moving optical fiber through these bores and into the curing chamber. Because the nitrogen gas is injected near the top of nitrogen injection assembly 100, potential leak points must be sealed to ensure the absence of oxygen from the UV curing chamber. If leaks exist, oxygen from the ambient atmosphere may be drawn into the nitrogen injection assembly 100, possibly via a Ventura effect, as the nitrogen travels down the bore and into the UV curing chamber.

O-rings 156, 160, 164, 168, 172 and 176 seal the components of nitrogen injection assembly 100 at various potential leak points. A first O-ring 156 is positioned between coloring die mounting plate 104 and nitrogen injection ring 108. A second O-ring 172 is positioned between holder ring 112 and nitrogen injection ring 108. Third and fourth O-rings 160 and 164 are positioned between the outer diameter of stationary telescope tube 116 and the inner diameter of sliding telescope tube 120. A fifth O-ring 168 is located between base 124 and the inner diameter of sliding telescope tube 120. A sixth O-ring 176 is positioned between base 124 and a UV oven 128.

Applicants have found that this conventional nitrogen injection assembly has a few disadvantages. The number of potential leak points and the number of O-rings makes the assembly particularly susceptible to ambient air leaks that can disrupt the curing process. These O-rings are not quickly and easily repaired. Additionally, the assembly hampers efficient setup for the coating process. In particular, the space provided by sliding telescope tube 120 is relatively confined for an operator to attach a leader to the drawn fiber. Consequently, the risk of breaking a fiber is often higher than desired.

A second prior art configuration is illustrated by Japanese Patent No. 4-342445. The apparatus disclosed in JP 4-342445 provides for the coloring of an optical fiber in an oxygen-free environment. A "connection means," located between a coating apparatus and a curing oven, forms a sealed cylindrical conduit for passing an optical fiber. In this prior art configuration, the optical fiber is coated with uncured dye, passed through the "connection means," and fed into the curing chamber—all in an environment containing pure nitrogen. In this manner, the connection means of JP 4-342445 forms an air-tight seal between the coating apparatus and the curing oven allowing the entire coating and curing process to be performed in an oxygen-free environment.

The apparatus disclosed in JP 4-342445 suffers from many of the same disadvantages as the prior art apparatus disclosed in FIG. 1. In addition, this conventional nitrogen injection assembly unnecessarily prevents the exposure of uncured dye to oxygen.

SUMMARY OF THE INVENTION

In accordance with the present invention, an apparatus for coloring and curing ink on an optical fiber prevents the coated fiber from being exposed to oxygen as it passes into a curing chamber while minimizing the number of seals and potential leak points. Applicants have discovered that the location in which nitrogen is injected into the apparatus affects the likelihood of ambient air degrading the quality of the coating and curing process.

In one aspect consistent with the general principles of the present invention, an apparatus for coloring and curing an optical fiber that passes in a downstream direction during manufacture includes a coloring assembly for depositing an ink on the optical fiber, a cover section, a distribution seal, and a UV curing assembly.

The cover section is positioned downstream from the coloring assembly and has an interior surface and an exterior surface. The interior surface of the cover section at least partially encloses and defines a first duct that is configured to pass the coated optical fiber. The cover section is configured to enable access to the coated optical fiber. In one alternative, the cover section includes a first axial telescope portion and a second axial telescope portion. In another alternative, the cover section includes a first radial or half-tube portion and a second radial or half-tube portion. In a third alternative, the cover section is a flat plate.

The distribution seal of the apparatus is positioned downstream from the cover section and has an interior surface, an exterior surface, and an inlet port. The interior surface of the distribution seal at least partially defines a first bore that is configured to pass the optical fiber received from the cover section. The inlet port extends from the exterior surface of the distribution seal to the interior surface. It is adapted to flow nitrogen into the first bore.

As well, a lead-in piece may be positioned between the distribution seal and the cover section. The lead-in piece has an interior surface and an exterior surface. The interior surface of the lead-in piece at least partially encloses a second bore capable of passing the coated optical fiber between the first duct of the cover section and the first bore of the distribution seal.

Finally, the UV curing assembly is positioned downstream from the distribution seal. It receives the coated optical fiber from the distribution seal and cures it in an oxygen-free environment.

The arrangement of components permits easy access to the optical fiber during setup and minimizes a risk of oxygen leaks during operation. With the distribution seal positioned downstream from the cover section, the apparatus can ensure that nitrogen surrounds the coated fiber as it enters the curing assembly while using a minimum number of seals.

In a second aspect, a nitrogen injection assembly for use in an apparatus for coloring and curing optical fibers that is consistent with the principles of the present invention includes a cover section and a distribution seal. The apparatus includes a color coating die and a curing chamber.

The cover section has an interior surface and an exterior surface. The interior surface at least partially encloses a first duct that is capable of passing a coated optical fiber.

The distribution seal is located closer to the curing chamber than the cover section. It has an interior surface, an exterior surface, and an inlet port. The interior surface of the distribution seal at least partially defines a first bore that is capable of passing the coated optical fiber. The inlet port extends from the exterior surface of the distribution seal and is adapted to allow nitrogen to flow into the first bore. The first bore is aligned axially with the first duct of the cover section.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute part of this specification, illustrate several embodiments of the invention and together with the description, serve to explain the principles of the invention.

FIG. 5 is a top-level view of a lead-in piece of the nitrogen injection assembly shown in FIG. 2;

FIG. 6 is a cross-sectional view of the lead-in piece of FIG. 5;

FIG. 7 is a top-level view of a cover section of the nitrogen injection assembly shown in FIG. 2;

FIG. 8 is a front view of the cover section of FIG. 7;

DETAILED DESCRIPTION OF THE PREFERRED EMBODIMENTS

Figure 1:
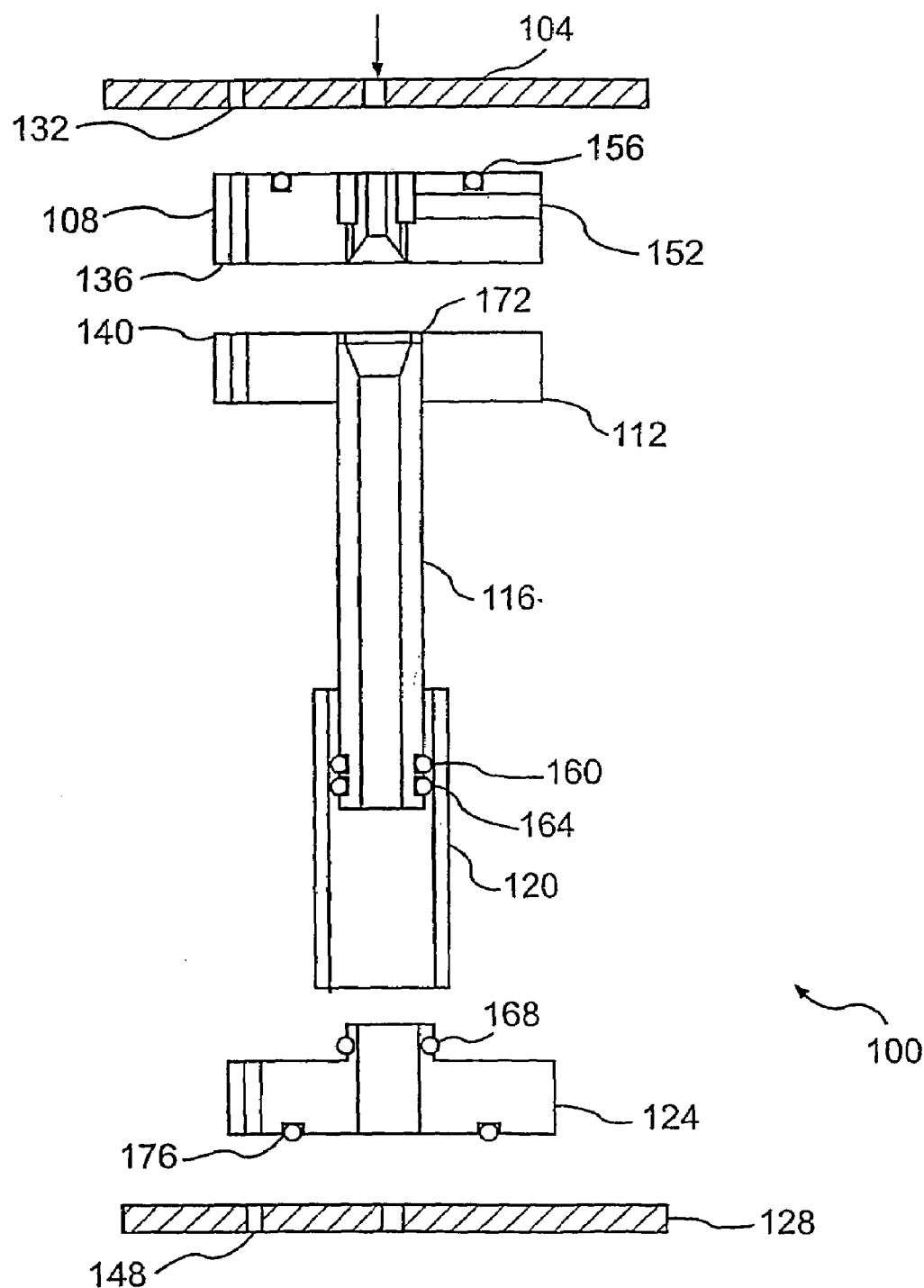
FIG. 1 is an exploded cross-sectional view of a conventional nitrogen injection assembly for use in coating and curing ink on an optical fiber.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with the general principles of the present invention, an apparatus for coating and curing ink on an optical fiber includes a coloring assembly, a cover section, a distribution seal, and a UV curing assembly. As herein embodied and illustrated in FIG. 2, an apparatus 200 for coloring and curing an optical fiber includes a die mounting plate 220, cover section 212, lead-in piece 208, distribution seal 204, and UV oven 216.

Figure 2:
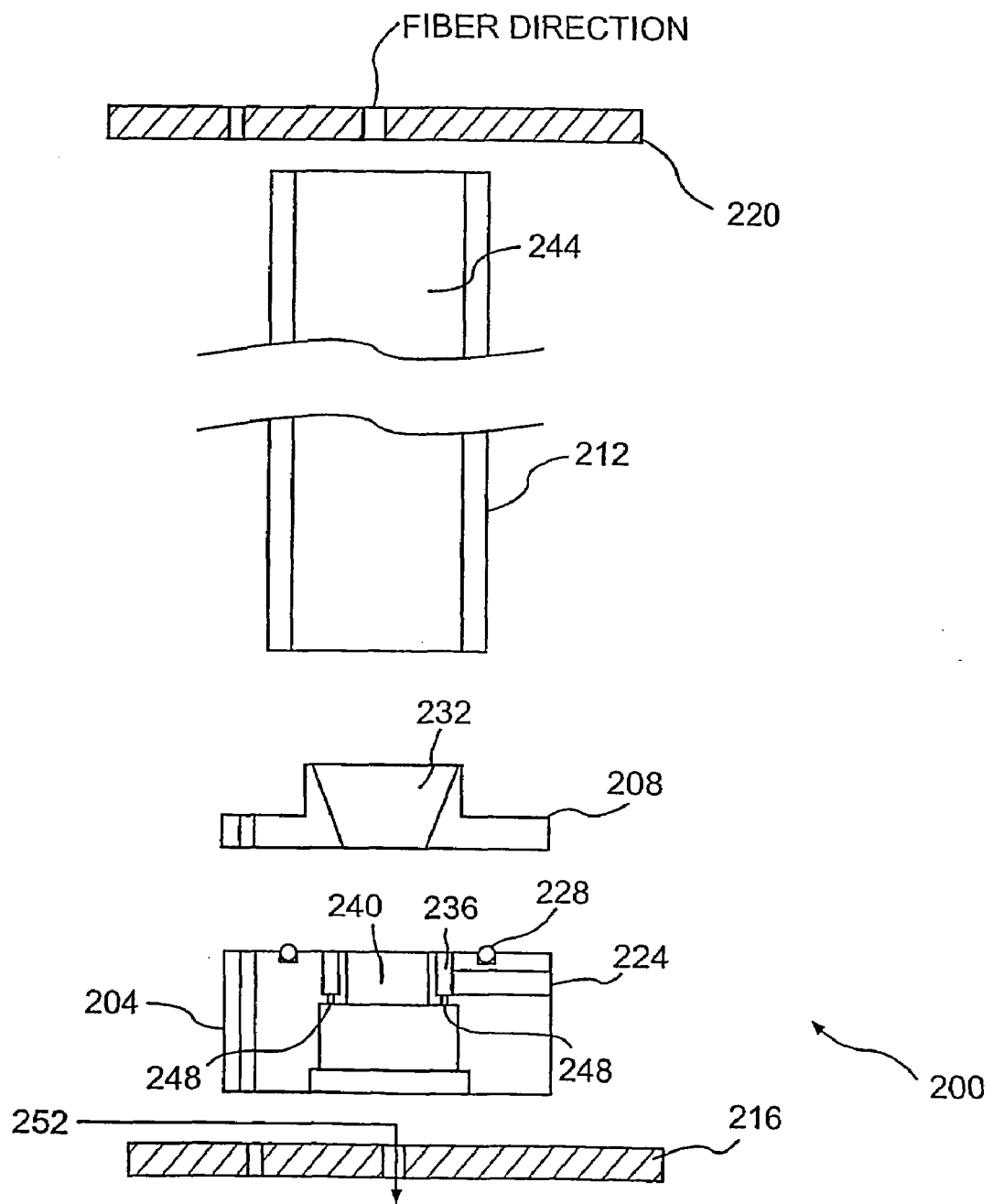
FIG. 2 is an exploded cross-sectional view of an embodiment of a nitrogen injection assembly consistent with the principles of the present invention.

Die mounting plate 220 is part of a larger coloring assembly (not shown). An optical fiber (not shown) is introduced into the coloring assembly after having been drawn in a conventional optical-fiber manufacturing process. The coloring assembly includes at least a coating die for applying radiation-curable ink to the optical fiber and die mounting plate 220. Various inks and techniques for applying the ink within a coloring assembly are within the knowledge of those of ordinary skill in the art and may be used without deviating from the scope of the present invention. In FIG. 2, die mounting plate 220 represents the last component of the coloring assembly that the coated optical fiber passes through.

Following die mounting plate 220 is a cover section 212. As explained in more detail below, cover section 212 is adapted to pass an optical fiber (not shown). It includes an interior surface and an exterior surface, where the interior surface at least partially defines a first duct or passageway 244 for the coated optical fiber leaving the coloring assembly. First duct 244 and cover section 212 are both preferably cylindrical in shape.

As shown in FIG. 2, a lead-in piece 208 and a distribution seal 204 are positioned below cover section 212. Lead-in piece 208 is preferably made of aluminum but can be made of any other material. Lead-in piece 208 defines a bore 232, which allows the optical fiber leaving cover section 212 to pass. Bore 232 of lead-in piece 208 can be a straight bore or may be tapered, as shown in FIG. 2. If tapered, bore 232 has a larger opening at the top of lead-in piece 208. In this configuration, the diameter of first duct 244 is substantially the same as an outer diameter of the top of lead-in piece 208 so that cover section 212 can fit over the top of lead-in piece 208. First duct 244 of cover section 212 is in substantial axial alignment with bore 232 of lead-in piece 208. In this manner, first duct 244 and bore 232 form a continuous passageway for an optical fiber.

Distribution seal 204 is positioned below lead-in piece 208 along the optical fiber path. Distribution seal 204, like cover section 212 and lead-in piece 208, can be machined from aluminum, or can be conveniently made from any other suitable material. It has an interior surface that at least partially defines a bore 240 capable of passing the coated optical fiber. In addition, distribution seal 204 may include a circular channel 236 positioned concentrically with an upper section of the bore 240. Conduits 248 may be formed in distribution seal 204 between circular channel 236 and bore 240.

Distribution seal 204 contains an inlet port 224 that allows the introduction of nitrogen and possibly other gases into bore 240. Inlet port 224 is preferably perpendicular to the axis of bore 240 but may be installed at any convenient angle. Preferably, inlet port 224 is connected to bore 240 by way of circular channel 236 and a plurality of conduits 248. That is, nitrogen gas introduced through inlet port 224 can flow into bore 240 after flowing through circular channel 236 and one or more of conduits 248. Alternatively, distribution seal 204 may be constructed so that inlet port 224 feeds nitrogen directly into bore 240. Inlet port 224 may be threaded to enable a nitrogen gas source to be connected quickly and easily. While a specific example is shown in FIG. 2, inlet port 224 can be located in any convenient manner such that nitrogen is permitted to enter bore 240.

Lead-in piece 208 may be affixed securely to distribution seal 204 with the aid of O-ring 228. In this manner, an airtight seal can be achieved between bore 232 and bore 240, and the two bores can form a continuous, sealed passageway for the coated optical fiber. Distribution seal 204 may similarly be affixed to UV oven 216 or other elements may be inserted in between. In this configuration, a bottom surface of the lead-in piece 208 may cover the top of the circular channel 236 so that a closed passageway is formed for the passage of nitrogen gas. Alternatively, a bottom surface of cover section 212 may cover an open top portion of the circular channel 236 so that a closed passageway is formed for the passage of nitrogen gas. In this configuration, nitrogen injection assembly 200 may comprise distribution seal 204 and cover section 212.

With the coating and curing apparatus illustrated in FIG. 2, a coated optical fiber can be shielded from ambient atmosphere when entering the curing chamber with a minimized risk of leaks. In operation, an optical fiber can pass from die mounting plate 220, through duct 244, through bore 232, through bore 240, and into curing chamber 252 in one continuous flow. Nitrogen gas would be injected through port 224 of distribution seal 204. As mentioned above, the nitrogen would pass into channel 236, downward through conduits 248, and into bore 240. Being spaced around channel 236, conduits 248 help to disperse the nitrogen as it enters bore 240. The proximity of distribution seal 204 to UV oven 216 helps to maintain a concentrated nitrogen atmosphere at the entrance to the curing chamber 252. Some nitrogen also flows upward in bore 240 into bore 232 of lead-in piece 208 and into first duct 244 of cover section 212. A minimum number of seals is required to secure the nitrogen environment in apparatus 200, such as O-ring 228 and possible seals (not shown) between cover section 212 and lead-in piece 208 and between cover section 212 and die mounting plate 220.

While the arrangement depicted in FIG. 2 is one embodiment of the present invention, other arrangements are within the knowledge of those skilled in the art. For example, lead-in piece 208 and distribution seal 204 could be made as a single piece. In this manner, an embodiment of the present invention would include two different components, one of which could be a cover section 212 and the other of which could be a single component which performs the functions of distribution seal 204 and lead-in piece 208. In yet another embodiment of the present invention, a single component can comprise distribution seal 204, lead-in piece 208, and cover section 212. In this fashion, an embodiment of the present invention would include a single component which performs the functions of distribution seal 204, lead-in piece 208, and cover section 212.

Figure 3:
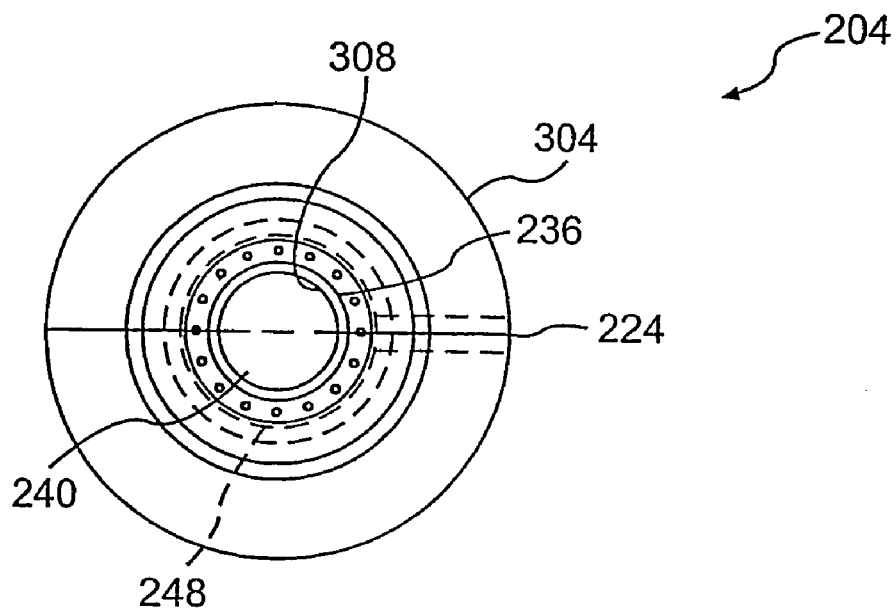
FIG. 3 is a top-level view of a distribution seal of the nitrogen injection assembly shown in FIG. 2.
Figure 4:
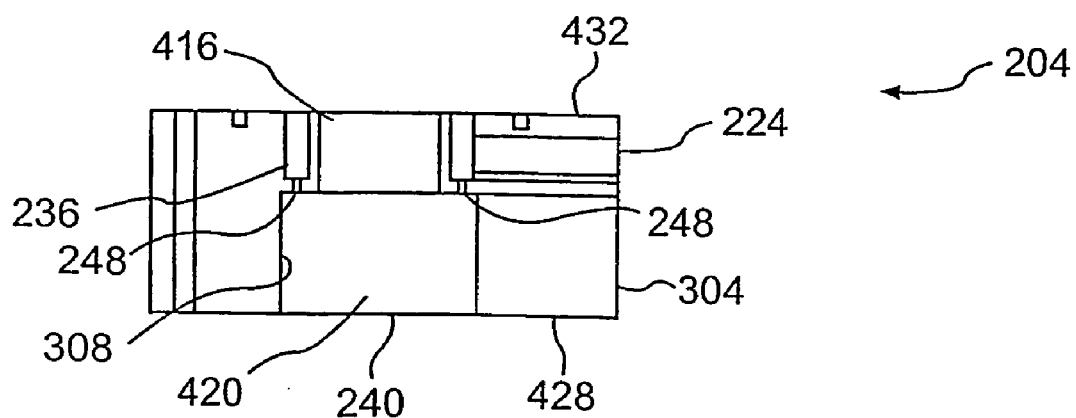
FIG. 4 is a cross-sectional view of the distribution seal of FIG. 3.

FIGS. 3 and 4 respectively illustrate top and side cross-sectional views of distribution seal 204. As shown in these drawings, distribution seal 204 has an exterior circumferential surface 304, an interior surface 308, a channel 236, a bore 240, and a plurality of conduits 248. Distribution seal 204 may also have a bottom surface 428 and a top surface 432. Bore 240 can extend from top surface 432 through distribution seal 204 to bottom surface 428. In this manner, bore 240 can be bounded by interior surface 308. Bore 240 may include an upper bore 416 and a lower bore 420. In this embodiment, upper bore 416 can have a smaller diameter than lower bore 420 and extend approximately halfway between top surface 432 and bottom surface 428. Lower bore 420 could extend from bottom surface 428 to approximately halfway between top surface 432 and bottom surface 428. Upper bore 416 is in substantial axial alignment with lower bore 420 so that upper bore 416 and lower bore 420 form a continuous passageway for an optical fiber. Preferably, bore 240, upper bore 412, and lower bore 420 are cylindrical.

Channel 236 could be machined into top surface 432 of distribution seal 204. Of course, channel 236 can be formed into top surface 432 of distribution seal 204 in any manner. Channel 236 can be circumferential in form and concentric with upper bore 416. A plurality of conduits 248 extend from channel 236 to lower bore 420. In this manner, a continuous opening may be formed through channel 236, through a plurality of conduits 248, and into lower bore 420.

Inlet port 224 extends from exterior circumferential surface 304 to channel 436. In a further embodiment, inlet port 224 could extend from exterior circumferential surface 304 directly to bore 240. Inlet port 224 is adapted so that nitrogen and possibly other gases can flow through inlet port 224, through channel 236, through a plurality of conduits 248, through lower bore 420, and through upper bore 416. It would be readily apparent to one skilled in the art that other arrangements exist for the flow of gas through inlet port 224 and into bore 240.

Referring now to FIGS. 5 and 6, FIG. 5 illustrates a top view of lead-in piece 208, and FIG. 6 represents a cross-sectional view of lead-in piece 208 in one embodiment of the present invention. In FIG. 6, bore 232, which may be bounded by interior surface 508, is depicted as being tapered. In this embodiment of the present invention, an upper cross section of bore 232 has a greater diameter than a lower cross section of bore 232. Bore 232 need not be tapered but may be of any shape that allows the passage of an optical fiber. Preferably, lead-in piece 208 also comprises flange 614. In this manner, an upper diameter of a horizontal-cross section of lead-in piece 208 may be smaller than a lower diameter of a horizontal cross section of lead-in piece 208. Flange 614, for example, can be attached to a top surface of distribution seal 204 of FIG. 2. In this configuration, a bottom surface of lead-in piece 208 may cover the channel 236 of distribution seal 204.

Referring now to FIGS. 7 and 8, FIG. 7 depicts a top view of cover section 212, and FIG. 8 depicts a side view of cover section 212. Cover section 212 may be a distinct component or it may be an integral portion of the lead-in piece 208. In FIG. 7, cover section 212 is comprised of first radial or half tube section 704 and a second radial or half tube section 708. When connected together in a closed position, first half tube section 704 and second half tube section 708 form a closed duct 244 for the passage of an optical fiber. Connection groove 712 is shown as an example of a connection that may occur between first half section 704 and second half section 708. Additionally, first half tube section 704 and second half tube section 708 may be connected together in a variety of ways, for example, by a hinge, a seal, or, as shown in FIG. 7, a connection groove 712.

Referring now to FIG. 8, cover section 212 has a top surface 812 and a bottom surface 816. A first duct 244 extends from top surface 812 through cover section 212 to bottom surface 816. In this embodiment, first half tube section 704 and second half tube section 708 can be joined together with clasp 812.

It would be obvious to one skilled in the art that other shapes for cover section 212 would readily function in the present invention. While a cylindrical cross-section is preferred, cover section 212 could have a square, elliptical, or polygonal cross section. Moreover, cover section 212 need not be of any particular length other than that determined for the application. In this manner, cover section 212 need not extend completely up to connect with die mounting plate 220 of FIG. 2.

In a further embodiment of the present invention, the cover section 212 as depicted in FIG. 2 can comprise two telescoping tubes. Similar to tubes 116 and 120 in FIG. 1, a first telescoping tube can be arranged to slide over a second telescoping tube. In this manner, one of the telescoping tubes can slide up and over the other telescoping tube. When used in the present invention, sliding one telescoping tube up over the second telescoping tube can provide access to the optical fiber so that a leader can be attached during a setup mode for the system. Due to the placement of cover section 212 upstream from distribution seal 204, the telescoping tube assembly for cover section 212 could be constructed without any, or with few, O-rings.

Figure 10:
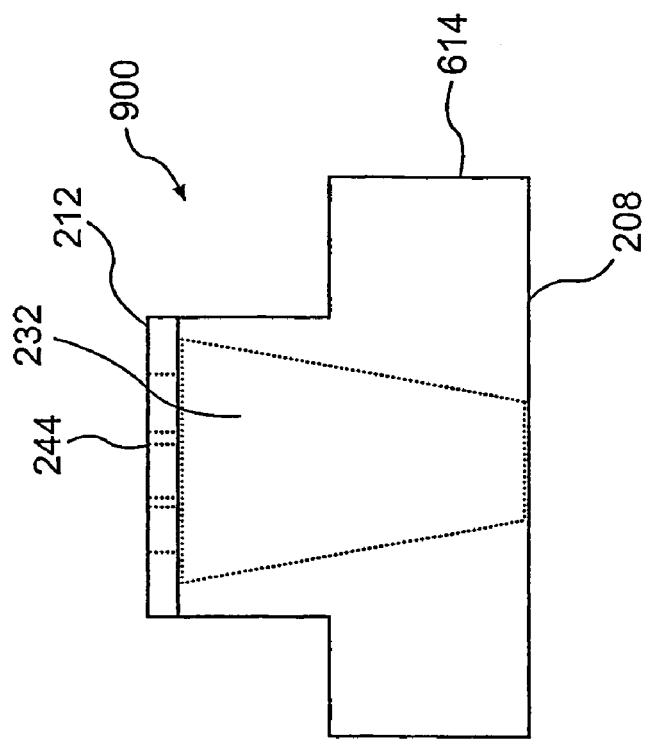
FIG. 10 is a cross-sectional view of the combined cover section and lead-in piece of FIG. 9.
Figure 9:
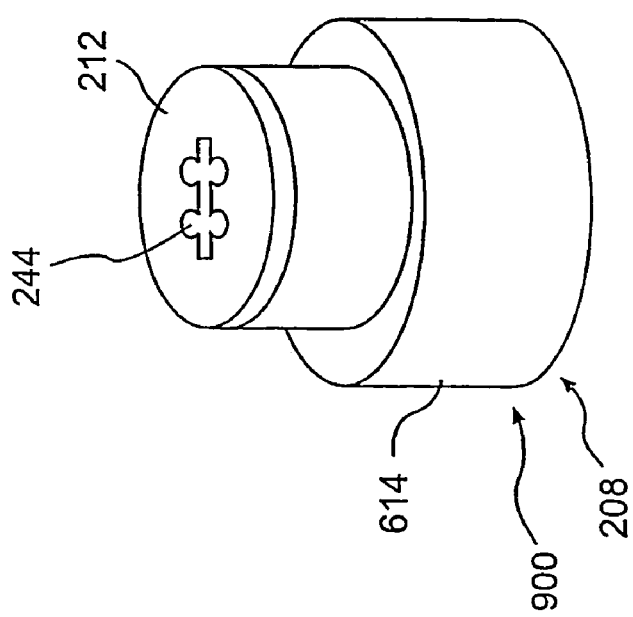
FIG. 9 is a perspective view of another embodiment for the cover section and lead-in piece consistent with the principles of the present invention.

FIG. 9 depicts a variation consistent with the principles of the present invention where cover section 212 and lead-in piece 208 are combined into a single component 900. FIG. 10 depicts a cross sectional view of component 900. Lead-in piece 208 can have a flange 614 which can be used, for example, to attach lead-in piece 208 to distribution seal 204.

As shown in FIG. 10, cover section 212 may be integrally connected to the top surface of lead-in piece 208 to form component 900. In this embodiment, cover section 212 is a flat plate with a first duct 244. The opening of duct or ducts 244 is relatively constrained to prohibit ambient air from passing downward into the nitrogen injection assembly with the optical fiber. A sufficient flow of nitrogen is made to pass upwardly through duct 244 to prevent the ingress of oxygen. In the embodiment depicted in FIGS. 9 and 10, first duct 244 is configured to accept four optical fibers, though any number may be accepted in other embodiments of the present invention. Bore 232 extends from a top surface of lead-in piece 208 to a bottom surface of lead-in piece 208. While bore 232 is shown as tapered, it could have any shape permitted by the particular application in which it is used. Lead-in piece 208 also comprises flange 614 for attaching it to distribution seal 204.

In the embodiment in which cover section 212 is formed of a flat plate, access to the optical fibers during setup may occur above the plate. That is, depending on the configuration required for the particular use, a gap is left between cover section 212 and die mounting plate 220. Preferably, this gap extends about six inches from cover section 212 to die mounting plate 220. In this gap, an operator or craftsman can access the optical fiber after threading the coating die and attach a leader to help pull the fiber through the entire coating and curing apparatus.

In a further embodiment of the present invention, distribution seal 204, lead-in piece 208, and cover section 212 may form a single component (not shown). This component (not shown), like component 900, can include a cover section 212 in the form of a flat plate as depicted in FIGS. 9 and 10.

It should be noted that other components and structures may be employed with the nitrogen injection assembly of this invention without departing from the spirit and scope of the invention. Such components and structures may include various mounting plates, ring holders, and other elements as known by those skilled in the art.

It should be understood that the foregoing relates only to the exemplary embodiments of the present invention. For example, variations in the shape or configuration of the bores and ducts that form a passageway are not restricted by the particular examples illustrated and described herein. Namely, the disclosed apparatus may be configured to permit the coating and curing of ink on more than one optical fiber at a time. Numerous changes may be made thereto without departing from the scope of the invention as defined by the following claims.

What is claimed is:

1. A nitrogen injection assembly for use in an apparatus for coloring and curing optical fibers, the apparatus including a color coating die and a curing chamber, the nitrogen injection assembly comprising:
 a cover section separated from the color coating die, the cover section having an interior surface and an exterior surface, the interior surface of the cover section at least partially enclosing a first duct capable of passing a coated optical fiber; and
 a distribution seal located closer to the curing chamber than the cover section and having an interior surface, an exterior surface, and an inlet port, the interior surface of the distribution seal at least partially defining a first bore capable of passing the coated optical fiber, the first bore being aligned axially with the first duct of the cover section and including upper and lower cylindrical sections, the upper cylindrical section having a smaller diameter than the lower cylindrical section, wherein the distribution seal includes a circular channel concentric with the upper cylindrical section of the first bore, and wherein the inlet port extends between the exterior surface of the distribution seal and the circular channel and is adapted to allow nitrogen to flow into the first bore.

2. The nitrogen injection assembly of claim 1, further comprising a lead-in piece positioned between the distribution seal and the cover section, the lead-in piece having an interior surface and an exterior surface, the interior surface of the lead-in piece at least partially enclosing a second bore capable of passing the coated optical fiber between the first duct and the first bore.

3. The nitrogen injection assembly of claim 2, wherein the lead-in piece has a circular top surface and a circular bottom surface, the second bore having a substantially same diameter at the circular bottom surface as an upper portion of the first bore of the distribution seal.

4. The nitrogen injection assembly of claim 2, wherein the lead-in piece is affixed to the distribution, substantially preventing entry of ambient atmosphere into the first and second bores.

5. The nitrogen injection assembly of claim 4, wherein a bottom portion of the lead-in piece forms a flange.

6. The nitrogen injection assembly of claim 2, wherein the lead-in piece has a circular top surface and a circular bottom surface, a diameter of the top surface being less than a diameter of the bottom surface, the second bore of the lead-in piece extending from the circular top surface to the circular bottom surface.

7. The nitrogen injection assembly of claim 2, wherein the second bore of the lead-in piece is tapered.

8. The nitrogen injection assembly of claim 2, wherein the cover section is a flat plate mounted on top of the lead-in piece.

9. The nitrogen injection assembly of claim 1, wherein the distribution seal includes a plurality of conduits between the circular channel and the lower bore.

10. The nitrogen injection assembly of claim 1, wherein the cover section is configured to enable access to the coated optical fiber.

11. The nitrogen injection assembly of claim 10, wherein the separation between the cover section and the color coating die provides access to the coated optical fiber.

12. The nitrogen injection assembly of claim 10, wherein the cover section comprises a first axial telescope portion and a second axial telescope portion, the second axial telescope portion being slidable at least partially within the first axial telescope portion.

13. The nitrogen injection assembly of claim 10, wherein the cover section comprises a first radial portion and a second radial portion, the first duct of the cover section being formed by alignment of at least the first and second radial portions.

14. A nitrogen injection assembly for use in an apparatus for coloring and curing optical fibers, the apparatus including a color coating die and a curing chamber, the nitrogen injection assembly comprising:
 a cover section separated from the color coating die, the cover section having an interior surface and an exterior surface, the interior surface of the cover section at least partially enclosing a first duct capable of passing a coated optical fiber;
 a distribution seal located closer to the curing chamber than the cover section and having an interior surface, an exterior surface, and an inlet port, the interior surface of the distribution seal at least partially defining a first bore capable of passing the coated optical fiber, the first bore being aligned axially with the first duct of the cover section and including upper and lower cylindrical sections, the upper cylindrical section having a smaller diameter than the lower cylindrical section, wherein the distribution seal includes a circular channel concentric with the upper cylindrical section of the first bore and a plurality of conduits extending between the circular channel and the lower bore, and wherein the inlet port extends between the exterior surface of the distribution seal and the circular channel and is adapted to allow nitrogen to flow into the first bore; and
 a lead-in piece positioned between the distribution seal and the cover section, the lead-in piece having an interior surface and an exterior surface, the interior surface of the lead-in piece at least partially enclosing a second bore capable of passing the coated optical fiber between the first duct and the first bore, wherein a bottom surface of the lead-in piece covers an open top portion of the circular channel.

15. An apparatus for coloring and curing an optical fiber passing in a downstream direction during manufacture, comprising:
 a coloring assembly for depositing an ink on the optical fiber;
 a cover section separated from the coloring assembly by an air gap and having an interior surface and an exterior surface, the interior surface of the cover section at least partially enclosing a first duct configured to pass the optical fiber;
 a distribution seal positioned downstream from the cover section and having an interior surface, an exterior surface, and an inlet port, the interior surface of the distribution seal at least partially defining a first bore configured to pass the optical fiber, the inlet port extending from the exterior surface of the distribution seal to the interior surface of the distribution seal and being adapted to flow nitrogen into the first bore, wherein the first bore defined by the interior surface of the distribution seal includes upper and lower cylindrical sections, the upper cylindrical section having a smaller diameter than the lower cylindrical section, wherein the distribution seal includes a circular channel concentric with the upper cylindrical section of the first bore, and wherein the inlet port extends between the exterior surface of the distribution seal and the circular channel; and a UV curing assembly positioned downstream from the distribution seal.

16. The optical fiber coloring and curing apparatus of claim 15, further comprising a lead-in piece positioned between the distribution seal and the cover section, the lead-in piece having an interior surface and an exterior surface, the interior surface of the lead-in piece at least partially defining a second bore, the second bore being in substantial axial alignment with the first bore of the distribution seal.

17. The optical fiber coloring and curing apparatus of claim 15, wherein the cover section is configured to enable access to the coated optical fiber.

18. The optical fiber coloring and curing apparatus of claim 17, wherein the cover section comprises a first axial telescope portion and a second axial telescope portion, the second axial telescope portion being slidable at least partially within the first axial telescope portion.

19. The optical fiber coloring and curing apparatus of claim 17, wherein the cover section comprises a first half tube section and a second half tube section, the first and second half tube sections each having a substantially semi-circular cross section, the first half tube section and the second half tube section forming the first duct when the cover section is in a closed position.

20. The optical fiber coloring and curing apparatus of claim 17, further comprising a lead-in piece positioned between the distribution seal and the cover section, the lead-in piece having an interior surface and an exterior surface, the interior surface of the lead-in piece at least partially enclosing a second bore capable of passing the coated optical fiber between the first duct and the first bore, wherein the cover section is a flat plate mounted on top of the lead-in piece.

* * * * *